United States Patent [19]
Groves et al.

[11] Patent Number: 5,321,243
[45] Date of Patent: Jun. 14, 1994

[54] CARD READER APPARATUS WITH READ HEAD MOUNTING STRUCTURE AND CARD GUIDE

[75] Inventors: David H. Groves, Tottenham; Ki Sheung Yuen, Brampton; Yiu Kong Wong, Scarborough, all of Canada

[73] Assignee: International Verifact Inc., Toronto, Canada

[21] Appl. No.: 836,515

[22] Filed: Feb. 18, 1992

[51] Int. Cl.$^5$ .............................................. G06F 7/08
[52] U.S. Cl. .................................. 235/449; 235/436; 235/484; 235/483
[58] Field of Search ............... 235/449, 482, 483, 484, 235/436; 360/2

[56] References Cited

U.S. PATENT DOCUMENTS

| | | | |
|---|---|---|---|
| 4,788,420 | 11/1988 | Chang | 235/483 |
| 5,019,696 | 5/1991 | Chang | 235/436 |
| 5,091,811 | 2/1992 | Chang | 360/104 |
| 5,128,524 | 7/1992 | Anglin | 235/449 |
| 5,164,576 | 11/1992 | Anglin | 235/483 |
| 5,173,597 | 12/1992 | Anglin | 235/483 |
| 5,180,905 | 1/1993 | Chen | 235/483 |

FOREIGN PATENT DOCUMENTS 0288484  11/1988  Japan .................................... 360/2

*Primary Examiner*—Harold Pitts

[57] ABSTRACT

A reading head mounting arrangement is disclosed. The arrangement comprises a base having a top surface and extending from a side thereof an upright mounting member for mounting of a reading head in proper spaced relationship from the top surface of the base for reading of a information containing stripe attached to a card. Preferably, the base has downwardly projecting portions at either end thereof to provide on and off ramps for a credit card being slid over the base, whereby when the arrangement is installed in a magnetic stripe reading terminal having a slot for passage of a credit card past a magnetic stripe reading head, the change in elevation of the base relative to the remainder of the slot provides a user of the terminal with positive feedback that the card is properly positioned in the slot. Accuracy in positioning the strip for movement past the magnetic head is predetermined during the manufacture of the mounting arrangement. The arrangement is used for mounting of a magnetic read head which may then be utilized in a terminal for providing authorization by a card issuer of the use of the card.

18 Claims, 4 Drawing Sheets

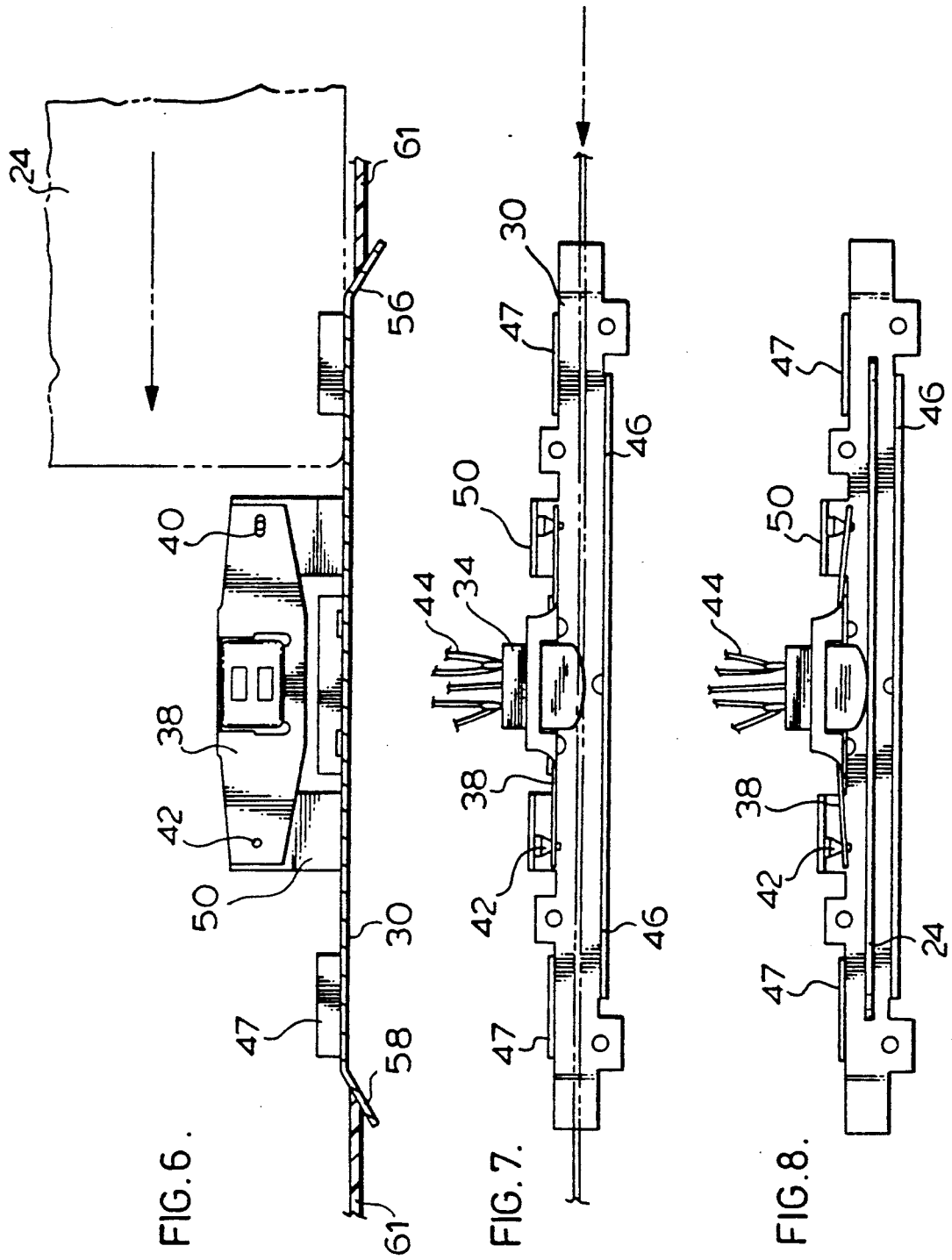

CARD READER APPARATUS WITH READ HEAD MOUNTING STRUCTURE AND CARD GUIDE

FIELD OF THE INVENTION

The present invention relates to an arrangement for mounting of a read head for reading and/or writing of information on a stripe attached to a card. In particular, the invention relates to an arrangement for accurately supporting a magnetic stripe read head for reading information on a magnetic stripe attached to a card as the card is slid past the head in a terminal for such cards.

BACKGROUND OF THE INVENTION

In recent years, the use of cards having information encoded in a magnetic stripe attached to the card has increased quite dramatically. Such cards include credit cards, debit cards, Automated Teller Machine (ATM) cards, proprietary gas company and retail outlet cards, health cards, discount cards, frequent shopper cards, transit passes, etc and may be made of many common materials such as paperboard, cardboard or plastic. One of the most common uses of magnetic stripe encoded information is with respect to credit cards for purchases of goods and services. The term "card" as used in this specification refers to any suitable substrate for receiving a magnetic stripe or other readable strip.

In order to provide for security of the use of the credit card, most credit card issuers require that a merchant obtain authorization of the purchase from the credit card issuer if the purchase exceeds a certain value. This was traditionally accomplished by the merchant telephoning the credit card issuer and an operator at the office of the issuer inputting information regarding the credit card account, merchant account and value of the purchase into the credit card issuer's computer to generate an authorization number which was then verbally transmitted to the merchant. With the dramatic increase in credit card usage, the manual approval process had become extremely costly in terms of employee time to the merchant and more particularly, the credit card issuer.

For a number of years now a number of cards, such as credit cards, debit cards, ATM cards, proprietary gas company and retail outlet cards, etc. have been issued with information regarding the card holder and the accounts accessible with the card recorded on a magnetic stripe attached to the card in accordance with International Standard ISO 7811. By utilizing the information recorded on the magnetic stripe, the approval process has been automated through the use of terminals such as point-of-sale terminals. Such point-of-sale terminals are generally pre-programmed with the merchant information, provide means for entry of the purchase amount, and have means for reading the card account information from the magnetic stripe on the card. The point-of-sale terminals are connected directly to the card issuers' computers over the telephone lines and provide a more rapid authorization of the purchase, thereby providing time saving for both the merchant and the card issuer.

In accordance with ISO Standard 7811, the relevant information is recorded in 2 or 3 tracks on the magnetic stripe, each of the tracks being 0.11 inches wide with a separation between tracks of 0.02 inches. Thus, in order to have proper entry of the information recorded on the magnetic stripe into a terminal, it is critical that proper registration of the magnetic stripe with the reading head of the terminal be accomplished. At the present time, with the current designs of the terminals and the magnetic stripe reader, this proper registration is not always accomplished, errors in entry may be made and the process of reading the card and inputting the information must be repeated thereby defeating in part the time saving offered by the automatic approval process.

The placement of the magnetic stripe relative to the base of the card is controlled accurately during the manufacture of the cards. Existing card readers often have a molded plastic guide track and it is difficult to maintain tight tolerances and the mounting of the magnetic read head can vary.

There remains a need for a more effective card reading arrangement.

SUMMARY OF THE INVENTION

The present invention provides for a reading head mounting arrangement comprising a base having a top surface and extending from a side thereof an upright mounting member for mounting of a reading head in proper spaced relationship from the top surface of the base for reading of a information containing stripe attached to a card.

In a preferred embodiment, the present invention provides for a magnetic stripe reading head mounting arrangement comprising a base having a top surface and extending from a side thereof an upright mounting member for mounting of a magnetic stripe reading head in proper spaced relationship from the top surface of the base for reading of a magnetic stripe attached to a card.

According to an aspect of the invention, the base further has downwardly projecting portions at either end thereof to provide on and off ramps for a credit card being slid over the base, whereby when the arrangement is installed in a magnetic stripe reading terminal having a slot for passage of a card past a magnetic stripe reading head, the change in elevation of the base relative to the remainder of the slot provides a user of the terminal with positive feedback that the card is properly positioned in the slot and that the base is above the plastic guide of the terminal whereby the positioning of the stripe is ensured.

In an aspect of the invention there is provided a magnetic stripe reader arrangement comprising a base having a top surface and extending from a side thereof upright mounting members having mounted thereon a magnetic stripe reading head in proper spaced relationship from the top surface of the base for reading of a magnetic stripe attached to a card. The base further has downwardly projecting portions at either end thereof to provide card on and off ramps. When the arrangement is installed in a magnetic stripe reading terminal having a slot for passage of a card past the magnetic stripe reading head, the change in elevation of the base relative to the remainder of the slot provides a user of the terminal with positive feedback that the card is properly positioned in the slot and ensures the arrangement is the structure determining the relative position of the stripe and the magnetic read head.

In another aspect of the invention, there is provided a card authorization terminal for providing authorization by the issuer of the use of the card. The terminal comprises a case having mounted therein the circuitry for communicating with a card issuer's computer, entry keys for manual entry of information, a display area for display of alphanumeric instructions and information, and a slot for passage of a card. The slot contains a magnetic stripe reading head for reading of information recorded on a magnetic stripe attached to the card, the magnetic stripe reading head being mounted on a mounting arrangement. The arrangement comprises a base having a top surface which forms at least a portion of the bottom of the slot, the top surface of the base being at a higher elevation than the remainder of the bottom of the slot. The base preferably has downwardly projecting portions at either end thereof to provide on and off ramps when a card is slid through the slot and over the base. The magnetic stripe reading head is mounted in proper spaced relationship from the top surface of the base on an upright mounting member or members extending from a side of the base.

BRIEF DESCRIPTION OF THE DRAWINGS

Preferred embodiments of the present invention are illustrated in the attached figures in which:

FIG. 6 is a front elevation view of the magnetic stripe reader arrangement of FIG. 4;

FIG. 7 is a top planar view of the magnetic stripe reader arrangement of FIG. 4; and FIG. 8 is a top planar view of the magnetic stripe reader arrangement of FIG. 4 during the passage of a credit card over the magnetic read head.

DETAILED DESCRIPTION OF THE PREFERRED EMBODIMENTS

Figure 1:
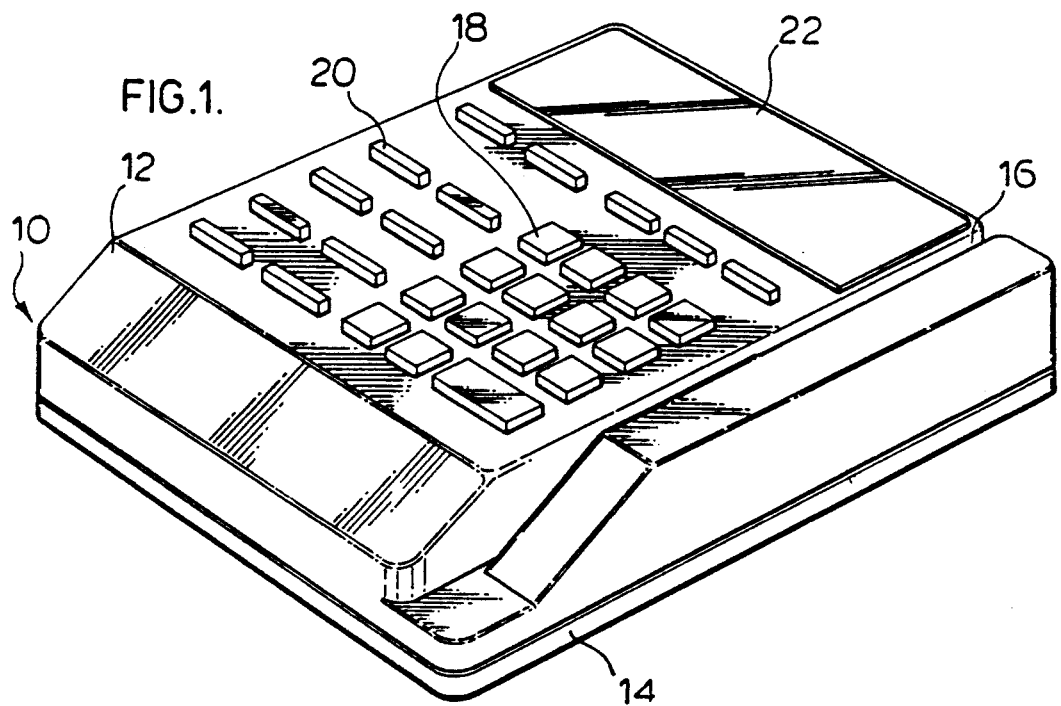
FIG. 1 is a perspective view of a point-of-sale terminal incorporating a magnetic stripe reader arrangement of the present invention.

FIG. 1 illustrates a point-of-sale terminal for use in approval of credit card transactions or debit card generally indicated by the numeral 10. The terminal 10 is generally contained in a plastic case having a case top 12 and a case bottom 14. The terminal 10 is provided with a slot 16 through which a credit card is slid for reading of credit card information contained on a magnetic stripe as will be described herein below. The terminal 10 also includes a number of keys which include numeric entry keys 18 and various function keys 20 for entry of information such as the value of the purchase, transaction type, or to respond to an inquiry given by the credit card issuer's computer. The case top 12 also has a display window 22 through which alphanumeric information is displayed utilizing liquid crystal diodes or light emitting diodes.

Figure 2:
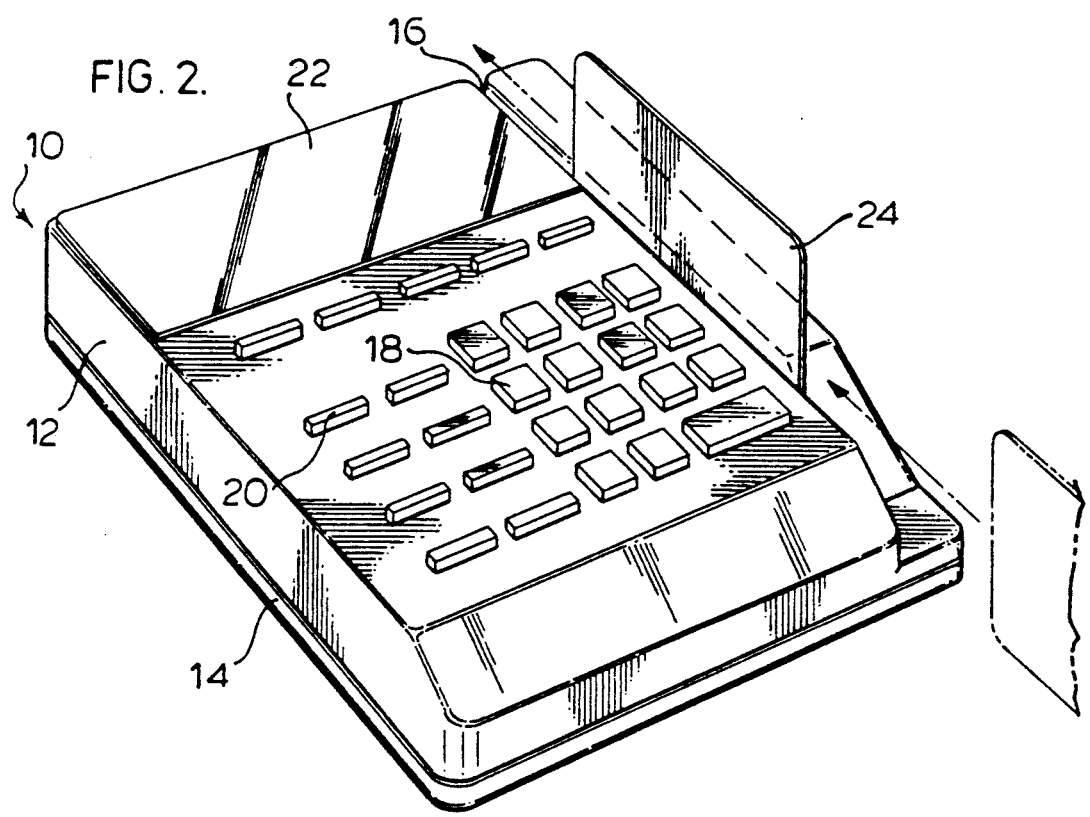
FIG. 2 is a further perspective view of the terminal of FIG. 1 illustrating its use during reading of a credit card.

The operation of the terminal 10 is illustrated in FIG. 2 where, as the customer makes a purchase, the customer's credit card 24 is inserted into slot 16 and slid therealong. The movement of the card through the length of the slot moves the magnetic stripe of the credit card directly past a magnetic read head of the terminal whereby information of any track of the stripe is read. The arrangement allows the card to be slid in either direction in the length of the slot. The information on the magnetic stripe is stored in accordance with International Standard ISO 7811. In response to the various prompts provided by the credit card issuer's computer and displayed in display window 22, the user of the terminal 10 enters the information requested by the numeric keys 18 and/or the function keys 20.

Figure 3:
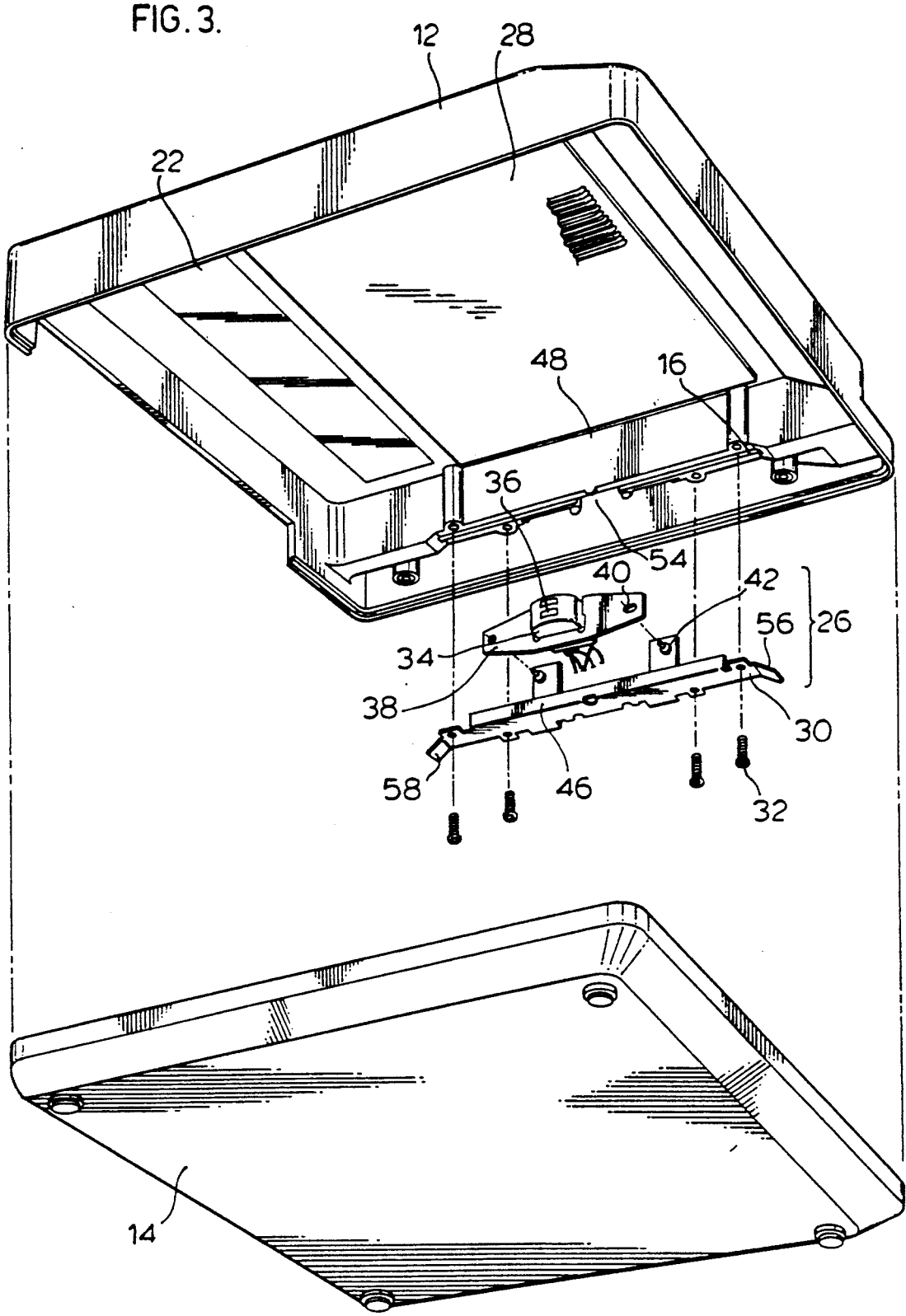
FIG. 3 is an exploded perspective view of the case of the terminal of FIG. 1 showing the magnetic stripe reader arrangement about to be secured in the terminal.

FIG. 3 shows an exploded perspective view of the point-of-sale terminal case and in particular, the magnetic stripe reader arrangement 26. The terminal is contained in the case having a top 12 and a bottom 14. Shown in the top 12 is the display window 22 for the display area and the underside of the key pad circuit board 28. The circuit board for the logic circuits and the telecommunications circuit necessary for communicating with the credit card issuer's computer are not shown in the figure but would be mounted in the case below the key pad circuit board 28. The magnetic stripe reader arrangement 26 is one piece and includes a base 30 which the guide surface which locates a credit card relative to the read head as the card is passed through slot 16. The base 30 has two upright mounting members 50 extending upwardly from the base and provided with mounting pins 42 in proper spaced relationship from the top surface of the base 30 to provide for accurate registration of the magnetic head 34 relative to base 30. For proper positioning of the base 30 relative the slot 16, the base 30 is provided with upright tab members 46 and 47 which overlay the portions of the case forming the walls of the slot 16. The slot 16 is open at the bottom thereof to allow the magnetic stripe reading head mounting arrangement 26 to be inserted from below, project above the portions of the slot 16 either side thereof, and be secured by screws 32.

Figure 4:
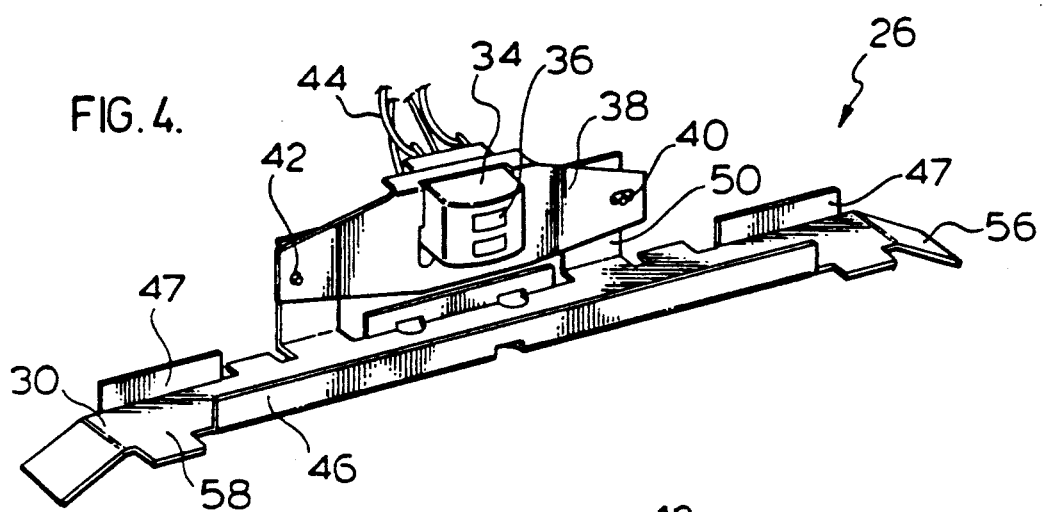
FIG. 4 is a perspective view of the magnetic stripe reader arrangement of FIG. 3.
Figure 5:
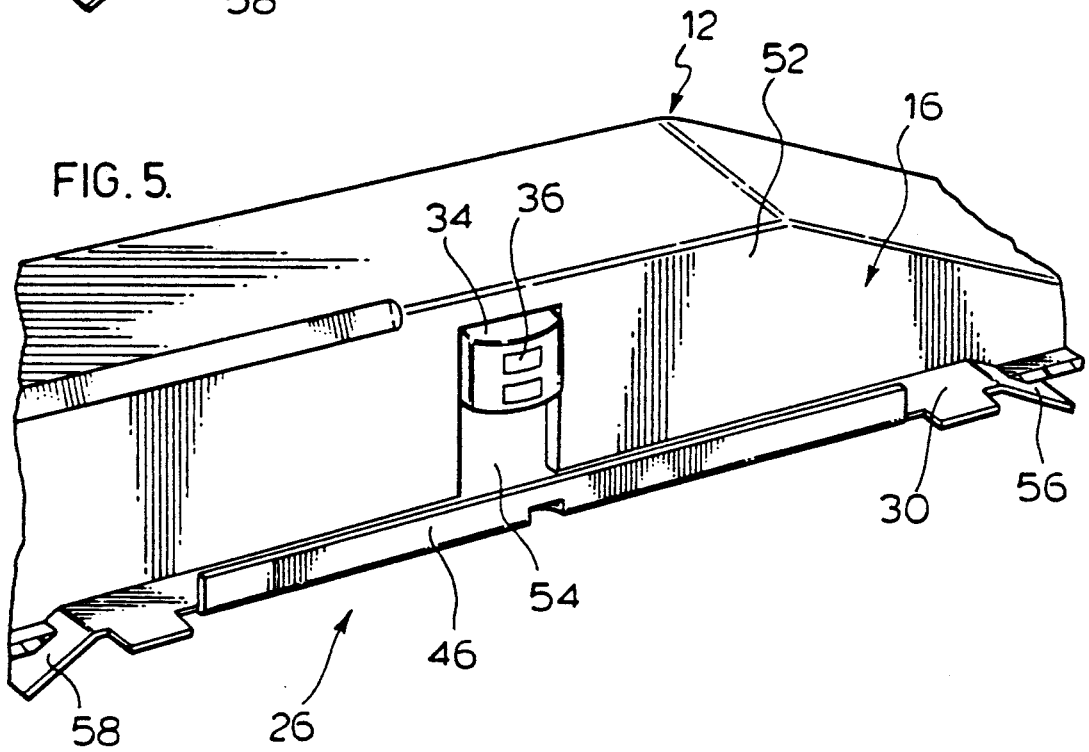
FIG. 5 is a perspective view in cross section of the magnetic stripe reader arrangement of FIG. 4 attached to the case.

FIGS. 3, 4 and 5 show particulars of the mounting arrangement and cooperation with the casing. The magnetic read head 34 has attached thereto a flexible mounting bracket 38 which will provide a resilient mount arrangement for the magnetic head 34. The flexible mounting bracket is permanently secured to the head 34 and comes as an assembled unit. Upright mounting members 50 project above the base 30, with each of the mounting members 50 having a mounting pin 42. The position of the mounting pins 42 above the base 30 forming the track of the credit card is accurately determined. The flexible mounting bracket 38 has holes 40 for cooperating with pins 42. One of the holes 40 may be elongated in shape to compensate for slight differences in spacing of the pins and to allow flexing of the mounting bracket 38 caused as a card is moved through the arrangement. The top casing 12 includes a cutout 54 in one side of the passageway 16 to allow mounting of the head once it has been secured within the mounting arrangement 26. The ports 40, provided in the flexible bracket 38, in combination with the pins 42 form a gimbal type mount and accurately position the multiple tracks 36 of the head 34 from the base 30. Data read by the magnetic head 34 is transferred via wires 44 to the circuitry of the point-of-sale terminal.

The mounting arrangement 26 is of a single piece of metal which can be accurately manufactured to predetermined precise positioning of the magnetic head 34 relative to the base 30. The top casing 12 can be molded to generally define the passage slot 16 which is open on the bottom surface to allow the base immediately below and either side of the magnetic head 34 to project into the slot and, thus, accurately define the portion of the slot that is used to position the credit card relative to the magnetic head 34. The on/off ramps 56 and 58 also partially project above what is the base of the slot 16, illustrated as 61 in FIG. 6. The arrangement 26 also includes an upright tab member 46 which on one side thereof, which in combination with opposed upright tab members 47 on the other side of the base 30, engage the outer walls of the passage 16 in the molded case. This, again, simplifies arrangement by having these members engage either side of the passage 16.

From the above, it can be appreciated that the accuracy on the upper cover 12, particularly with respect to passage 16, is not critical, as this member is adapted to receive a precision component which can be separately manufactured and when inserted in the case, predetermines the accurate relationship of the magnetic head 34 and the base 30 along which a credit card is moved. The construction of the top casing 12 is also simplified, as wear within the guide slot is no longer a problem and it has been found that with the arrangement as disclosed, advantages with respect to precision of the product, ease of assembly of the product and longevity of the product are realized.

FIG. 5 illustrates the magnetic stripe arrangement mounted in the case of the terminal. The wall 52 of the case top 12 forming the slot 16 is provided with a cut out 54 for passage of the magnetic head 34 during installation of the magnetic stripe reader arrangement 26 into the case top 12. When the magnetic stripe reader arrangement 26 is mounted in the case 12, the base 30 has downwardly projecting portions 56 and 58 at either end which provide for an on and off ramp respectively when the card is slid through the slot 16. The on and off ramps 56 and 58 force a change in elevation of the card during the passage of the card through the slot 16 and thereby provides a user of the terminal with positive feedback of the proper registration of the card relative to the slot to provide for proper alignment of the magnetic stripe on the card with the magnetic heads mounted in the slot. The on/off ramps provide a smooth transition from the passage 16, defined by the top cover 12, to the base 30, defined by arrangement 26. Note that a portion of the ramps remain below the slot in the bottom of the casing.

As shown in FIG. 7 and 8, the flexible mounting bracket 38 spring biases the head 34 past the center line of the slot 16. When the credit card 24 is slid through the slot 16, the head 34 is moved against the bias by the card to allow the card to pass by the head. In this way, the contact between the head 34 and the magnetic stripe of the card 24 is increased, reducing the incidence of false reading of the information contained on the magnetic stripe.

While the above description relates to a preferred embodiment of the invention for use with credit cards having the information stored in a magnetic stripe attached to the card in accordance with International Standard ISO 7811, it will be readily appreciated that the invention is useful with other types of cards. For example the invention is easily adaptable for use with other types of cards such as debit cards, ATM cards, proprietary gas company and retail outlet cards, health cards, discount cards, frequent shopper cards, transit passes, etc. In addition the invention is easily adaptable for use with any other existing or yet to be implemented standard which may be prescribed for such cards. Also the invention is easily adaptable to technologies for reading of stored information other than through the use of magnetic stripes, for example, optical based technologies utilizing lasers etc.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A magnetic stripe reader arrangement comprising a base having a top surface and extending from a side thereof upright mounting members having mounted thereon a combined magnetic stripe reading head and flexible mounting bracket in accurate spaced relationship from the top surface of the base for reading of a magnetic stripe attached to a card, the base further having downwardly projecting portions at either end thereof to provide on and off ramps when a card is slid over the base, and wherein the arrangement is installed in a magnetic stripe reading terminal having a longitudinally extending slot for passage of a card past the magnetic stripe reading head which slot is open at the bottom to allow said base to extend therethrough, such that said base directly supports a card as it is slid through the slot in the terminal past the reading head which is supported above said base a predetermined distance fixed by said base and said combined magnetic stripe reading head and flexible bracket.

2. A magnetic stripe reader arrangement as claimed in claim 1 wherein the arrangement is of metal and of fixed shape.

3. A magnetic stripe reader arrangement as claimed in claim 2 wherein the arrangement further includes upright locating members at either side of said base for positioning of the arrangement in the longitudinally extending slot of the terminal.

4. A magnetic stripe reader arrangement as claimed in claim 3 wherein the upright mounting members are provided with gimbal type mounting pins for mounting of magnetic stripe read head.

5. A magnetic stripe reader arrangement as claimed in claim 4 wherein the flexible mounting bracket has holes therein for engaging the pins on the upright mounting members and thereby accurately locating said reading head.

6. A magnetic stripe reader arrangement as claimed in claim 5 wherein the magnetic stripe has been attached to the card in accordance with International Standard ISO 7811.

7. A card authorization terminal for providing authorization by the issuer of the card of the use of the card, the terminal comprising a case, circuitry for communicating with a card issuer's computer, entry keys for manual entry of information, a display area for display of alphanumeric instructions and information, and a slot for passage of a card, said case defining sidewalls of said slot and a separate mounting arrangement forms a bottom portion of the slot, the slot having mounted therein a magnetic stripe reading head assembly for reading of information recorded on a magnetic stripe attached to the card, the magnetic stripe reading head assembly comprising a reading head directly supported by a flexible mounting bracket in a manner that the reading head is fixed in a precise position relative to said flexible mounting bracket, said flexible mounting bracket cooperating with and accurately positioned by pin members projecting from said separate mounting arrangement, said magnetic stripe reading head mounting arrangement comprising a base having a top surface which closes said slot at a bottom thereof, the top surface of the base being at a higher elevation than the remainder of the bottom of the slot, the base further having downwardly projecting portions at either end thereof to provide on and off ramps when a card is slid through the slot and over the base, said separate mounting arrangement including two upright mounting members extending from a side of the base, each upright member having fixed thereto one of said pin members positioned a predetermined non-adjustable distance above said top surface such that the position of said reading head above said top surface of said base is fixed by said mounting arrangement in combination with said magnetic stripe reading head assembly.

8. A card authorization terminal as claimed in claim 7 wherein said mounting arrangement is constructed of metal and is a single piece.

9. A card authorization terminal as claimed in claim 8 wherein the magnetic stripe reading head mounting arrangement further includes upright members at either side thereof which positions said mounting arrangement relative to the sidewalls of said slot in said case.

10. A card authorization terminal as claimed in claim 9 wherein the upright mounting members are provided with mounting pins for mounting of the magnetic stripe read head.

11. A card authorization terminal as claimed in claim 10 wherein the magnetic stripe read head is provided with a flexible mounting bracket having holes therein for positioning over the pins on the upright mounting members.

12. A card authorization terminal as claimed in claim 11 wherein the magnetic stripe has been attached to the card in accordance with International Standard ISO 7811.

13. In a card authorization terminal having a plastic casing with a slot guide therein through which a card is slid for reading of information coded on a stripe attached to the card, the improvement comprising the slot being open on the bottom and along one side for receiving a preformed read head mounting arrangement and a reading head from below said slot, said reading head mounting arrangement having a base positioned above what would otherwise be the bottom of the slot and acting as a bottom support and stabilizing member for a card slid through the slot, said mounting arrangement accurately supporting said reading head a predetermined distance above said base whereby errors caused by inaccurate positioning of the head relative to a stripe mounted on a card in a predetermined manner are avoided.

14. In a card authorization terminal as claimed in claim 13 wherein the plastic casing forms the sidewalls to contact opposed faces of a card and said mounting arrangement forms the bottom support surface of the slot over the portion of the slot required to accurately read the card.

15. In a card authorization terminal as claimed in claim 14 wherein said mounting arrangement includes downwardly extending on and off ramps providing a transition from the slot defined by the plastic casing and the bottom of the slot defined by said base.

16. In a card authorization terminal having a slot guide through which a card is slid for reading of information coded on a stripe attached to the card, said terminal comprising a plastic casing, a combined flexible mount bracket and read head, and a read head support arrangement; said slot guide being defined by said plastic casing and said read head support arrangement; said plastic casing defining side walls of said guide slot with said read head support arrangement forming the base of said slot and defining a guide surface for supporting a card as it is slid past the read head; one of said sidewalls of said guide slot including a port through which said read head projects into said guide slot; said read head support arrangement including upright members which are positioned immediately adjacent to said one wall to the outside of said guide slot, said upright members including fixed mounting pins which support and accurately position said flexible bracket and thereby accurately position said read head a predetermined distance above said base, and wherein said upright members and said guide surface are of a one piece construction.

17. In a card authorization terminal as claimed in claim 16 wherein said upright members and said guide surface are integral.

18. In a card authorization terminal as claimed in claim 16 wherein said read head support arrangement includes upright tabs which are attached to said guide surface and engage said sidewalls of said plastic case and thereby locate said read head support arrangement relative to said sidewalls.

* * * * *